(12) United States Patent
Girgis et al.

(10) Patent No.: US 8,104,260 B2
(45) Date of Patent: Jan. 31, 2012

(54) DESWIRLING EXHAUST MIXER

(75) Inventors: Sami Girgis, Montreal (CA); David F. Glasspoole, St. Lambert (CA)

(73) Assignee: Pratt & Whitney Canada Corp., Longueuil, QC (CA)

( * ) Notice: Subject to any disclaimer, the term of this patent is extended or adjusted under 35 U.S.C. 154(b) by 365 days.

(21) Appl. No.: 12/470,893

(22) Filed: May 22, 2009

(65) Prior Publication Data

US 2010/0293958 A1 Nov. 25, 2010

(51) Int. Cl.
*F02K 1/48* (2006.01)
(52) U.S. Cl. .......... 60/204; 60/264; 60/262; 239/265.19
(58) Field of Classification Search .................... 60/204, 60/226.1, 262, 264, 770; 239/265.17, 265.19; 181/213, 220
See application file for complete search history.

(56) References Cited

U.S. PATENT DOCUMENTS

| | | | |
|---|---|---|---|
| 4,045,957 A * | 9/1977 | DiSabato | 60/262 |
| 4,117,671 A | 10/1978 | Neal et al. | |
| 4,548,034 A * | 10/1985 | Maguire | 60/262 |
| 4,577,462 A | 3/1986 | Robertson | |
| 5,791,136 A | 8/1998 | Utamura et al. | |
| 6,606,854 B1 | 8/2003 | Siefker et al. | |
| 7,389,635 B2 | 6/2008 | Anderson et al. | |
| 2008/0105488 A1 * | 5/2008 | Dussillols et al. | 60/262 |

* cited by examiner

*Primary Examiner* — Ted Kim
(74) *Attorney, Agent, or Firm* — Norton Rose OR LLP

(57) ABSTRACT

An exhaust mixer for a gas turbine engine including a plurality of circumferentially distributed alternating inner and outer lobes, where each of the inner lobes is configured with a circumferential offset between the base and the tip thereof, and a direction of the circumferential offset defined from the base to the tip of each of the inner lobes is the same for all of the inner lobes and opposite to that of a swirl component of a main gas path flow entering the exhaust mixer.

16 Claims, 5 Drawing Sheets

DESWIRLING EXHAUST MIXER

TECHNICAL FIELD

The application relates generally to aircraft gas turbine engines and, more particularly, to gas turbine engine exhaust mixers.

BACKGROUND OF THE ART

The exhaust gas flow exiting a gas turbine engine has a high degree of swirl. It is desirable to deswirl the turbine exit flow to convert the kinetic energy of the flow into increased thrust. Typically, this is accomplished by a circumferential array of deswirling vanes provided between the turbine section and the exhaust mixer of the engine. These deswirling vanes are extra engine parts that add to the length and the weight of the engine.

Accordingly, there is a need to integrate the exhaust deswirling function to another existing part of the engine.

SUMMARY

In one aspect, there is provided an exhaust mixer for a gas turbine engine of the type having an annular bypass passage for channelling air from a fan flow and a main gas path passage, the exhaust mixer being adapted to receive a flow from the main gas path passage having a swirl component in a given direction, the exhaust mixer comprising an upstream end, a downstream end, and an annular wall extending therebetween and defining a plurality of circumferentially distributed alternating inner and outer lobes, the outer lobes protruding into the annular bypass passage and the inner lobes protruding into the main gas path passage, each of the inner lobes having a base defined in alignment with the upstream end of the mixer and a tip, each of the inner lobes being configured with a circumferential offset between the base and the tip thereof, a direction of the circumferential offset defined from the base to the tip of each of the inner lobes being the same for all of the inner lobes and opposite to that of the swirl component.

In another aspect, there is provided an exhaust mixer for a gas turbine engine of the type having an annular bypass passage for channelling air from a fan flow and a main gas path passage, the exhaust mixer comprising an upstream end, a downstream end, and an annular wall extending therebetween and defining a plurality of circumferentially distributed alternating inner and outer lobes, the outer lobes protruding into the annular bypass passage and the inner lobes protruding into the main gas path passage, each of the inner lobes having a base defined in alignment with the upstream end of the mixer and a respective radial direction extending between a center of the base thereof and a longitudinal axis of the mixer, and each of the inner lobes having a curved central line extending from the center of the base thereof to a center of a tip thereof and curving away from a same side of the respective radial direction.

In a further aspect, there is provided a method of removing at least part of a swirl component of a main gas path flow of a gas turbine engine, the method comprising receiving the main gas path flow with the swirl component at a discharge end of the gas turbine engine within an annular passage having an outer wall defined by a mixer, and directing each of a plurality of circumferential portions of the main gas path flow from an upstream end of the mixer to a downstream end of the mixer along the outer wall within a path defined at a constant angular position while forcing each of the plurality of circumferential portions of the flow along a direction curved with respect to a respective radial direction of the main gas path and oriented opposite to the swirl component.

DESCRIPTION OF THE DRAWINGS

Reference is now made to the accompanying figures, in which.

DETAILED DESCRIPTION OF THE PREFERRED EMBODIMENTS

Figure 1:
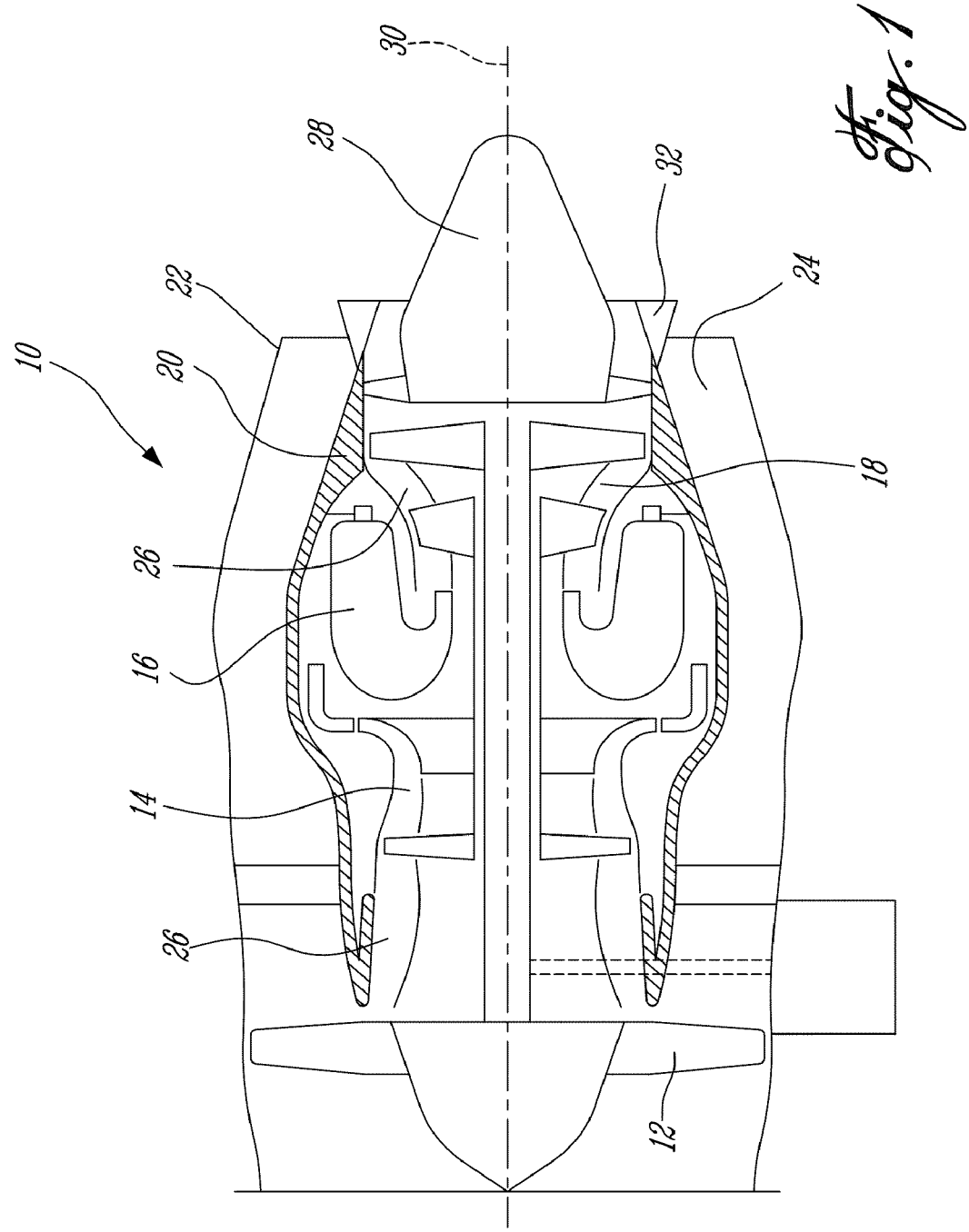
FIG. 1 is a schematic cross-sectional view of a turbofan gas turbine engine.

FIG. 1 illustrates a turbofan gas turbine engine 10 of a type preferably provided for use in subsonic flight, generally comprising in serial flow communication a fan 12 through which ambient air is propelled, a multistage compressor 14 for pressurizing the air, a combustor 16 in which the compressed air is mixed with fuel and ignited for generating an annular stream of hot combustion gases, and a turbine section 18 for extracting energy from the combustion gases.

The gas turbine engine 10 includes a first casing 20 which encloses the turbo machinery of the engine, and a second, outer casing 22 extending outwardly of the first casing 20 such as to define an annular bypass passage 24 therebetween. The air propelled by the fan 12 is split into a first portion which flows around the first casing 20 within the bypass passage 24, and a second portion which flows through a main gas path 26 which is defined within the first casing 20 and allows the flow to circulate through the multistage compressor 14, combustor 16 and turbine section 18 as described above.

At the aft end of the engine 10, an axisymmetrical bullet 28 is centered on a longitudinal axis 30 of the engine 10 and defines an inner wall of the main gas path 26 so that the combustion gases flow therearound. An annular mixer 32 surrounds at least a portion of the bullet 28, the mixer 32 acting as a rearmost portion of the outer wall defining the main gas path 26 and a rearmost portion of the inner wall defining the bypass passage 24. The hot combustion gases from the main gas path 26 and the cooler air from the bypass passage 24 are thus mixed together by the mixer 32 at the exit thereof such as to produce an exhaust with a reduced temperature.

Figure 2:
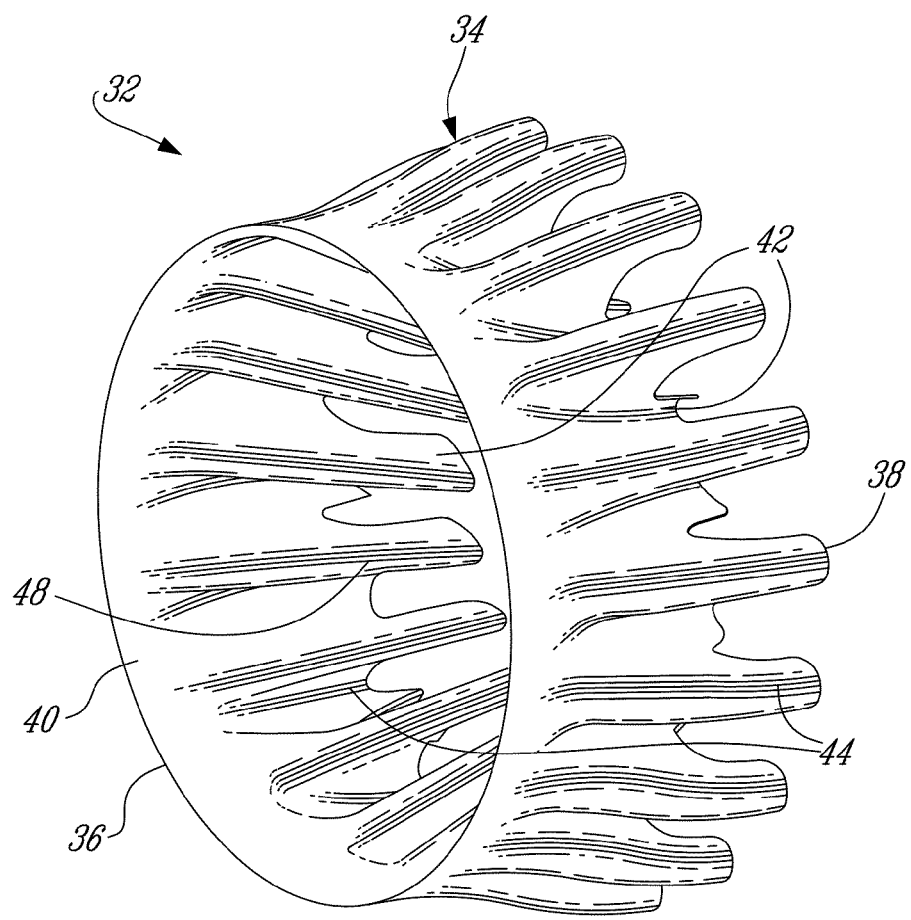
FIG. 2 is a perspective view of a mixer which can be used in a gas turbine engine such as shown in FIG. 1.

Referring to FIG. 2, the mixer 32 includes an annular wall 34 defining an upstream end 36 of the mixer 32 along which the flows from the main gas path 26 and from the bypass passage 24 are received, and a downstream end 38 where the two flows meet and are mixed together. The annular wall 34 includes a frustoconical portion 40 extending from and defining the upstream end 36, the frustoconical portion 40 having a diameter progressively reducing toward the downstream end 38. The annular wall 34 also defines a plurality of circumferentially distributed lobes extending rearwardly from the frustoconical portion 40. The lobes include alternating inner and outer lobes 42, 44, with the outer lobes 44 extending into the bypass passage 24 and the inner lobes 42 extending into the main gas path 26. As such, the inner lobes 42 define troughs in the bypass passage 24 in between adjacent ones of the outer lobes 44, while the outer lobes 44 define troughs in the main gas path 26 in between adjacent ones of the inner lobes 42. In the embodiment shown, each lobe 42, 44 has a radially elongated cross-section including a rounded tip 48, and extends longitudinally from the frustoconical portion 40 to the downstream end 38 of the mixer 32.

Prior engines typically include deswirling vanes located upstream of the mixer which remove a maximum portion of the swirl present in the combustion gases flow, so that the mixer acts to mix an axial or almost axial flow from the main gas path with an axial air flow from the bypass passage. The present mixer 32 however also acts to remove some, and in a particular embodiment a major portion of, the swirl of the combustion gases flow, so that the combustion gases enter the mixer 32 with a flow including a swirling component, and exit the mixer 32 with an axial or substantially axial flow. As such, in a particular embodiment, the deswirling vanes can be reduced in count, thus reducing the weight of the gas turbine engine without increasing its specific fuel consumption.

Figure 3:
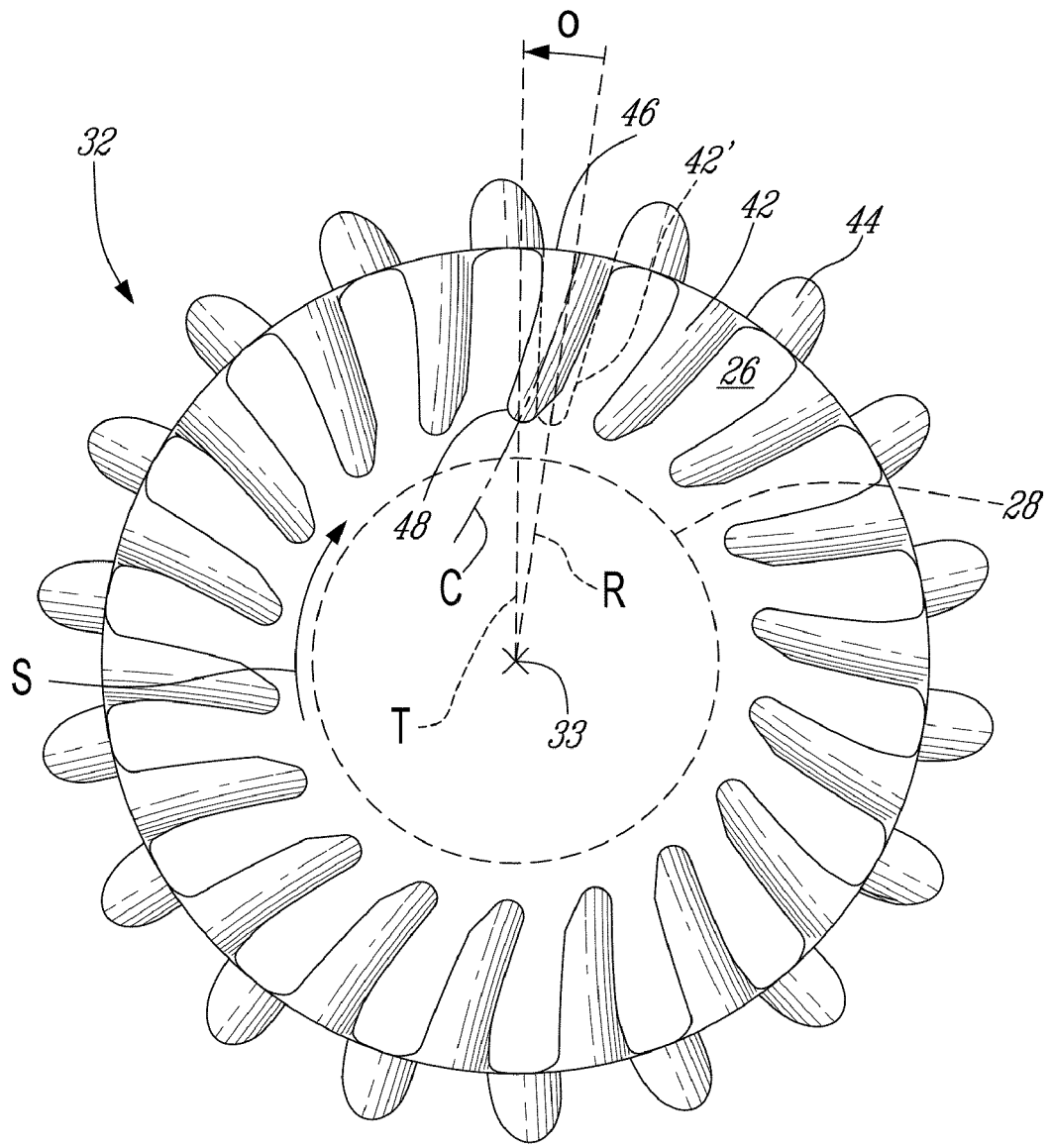
FIG. 3 is a front view of the mixer of FIG. 2.
Figure 4:
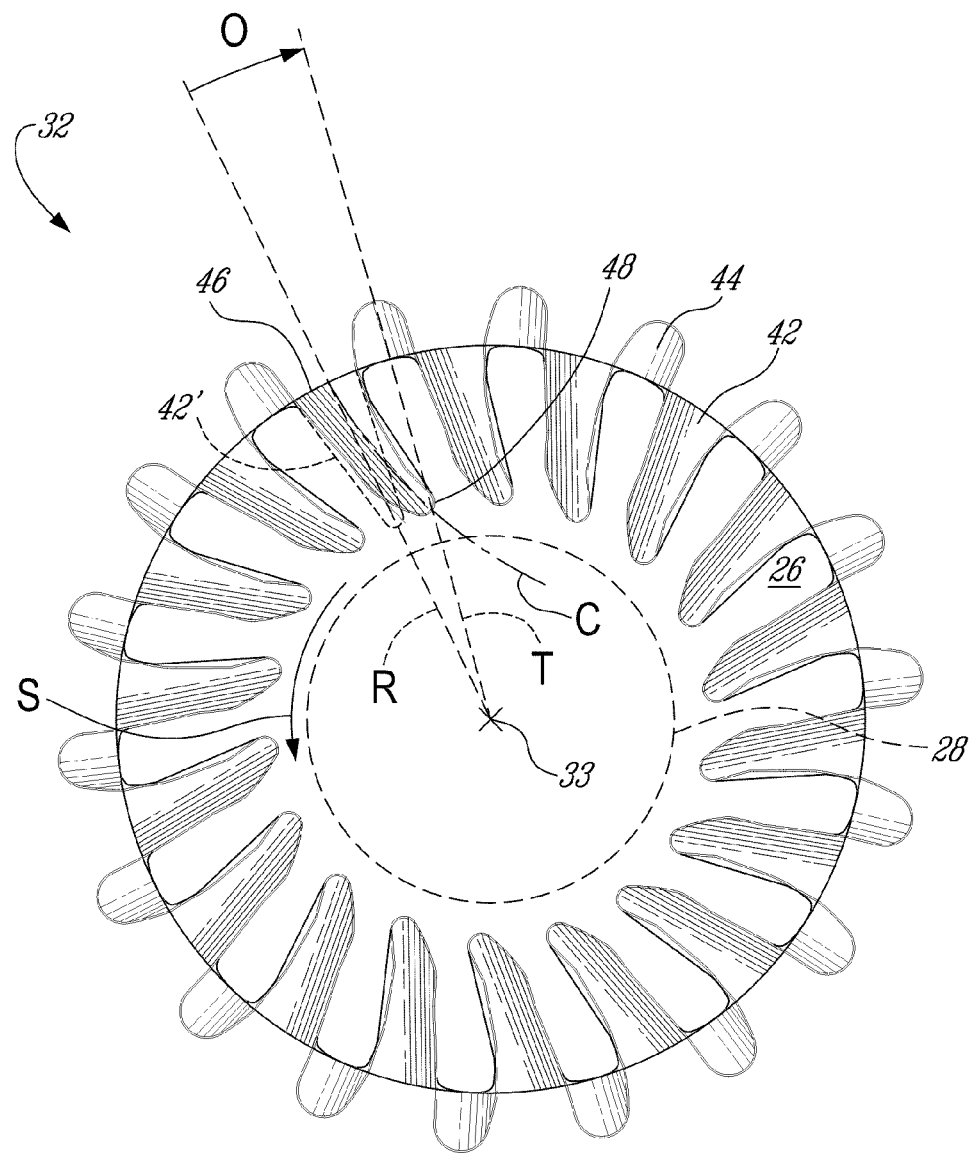
FIG. 4 is a rear view of the mixer of FIG. 2.

Referring to FIGS. 3 and 4, each inner and outer lobe 42, 44 includes a base 46 which is defined as the portion thereof in alignment with the upstream end 36 of the mixer 32. A respective radial direction R of the main gas path 26 is defined for each of the inner lobes 42 by a straight line or radius extending between the longitudinal axis 33 of the mixer 32, which corresponds to that of the engine 10, and the center of the base 46 of that inner lobe 42. As can be seen in the Figures, each inner lobe 42 has a cross-section that is curved with respect to the respective radial direction R, as illustrated by the curved inner lobe central line C. A radially straight inner lobe 42' is shown in phantom for comparison. The inner lobes 42 curve following an orientation opposite to that of the swirl S of the combustion flow entering the mixer 32.

Figure 5:
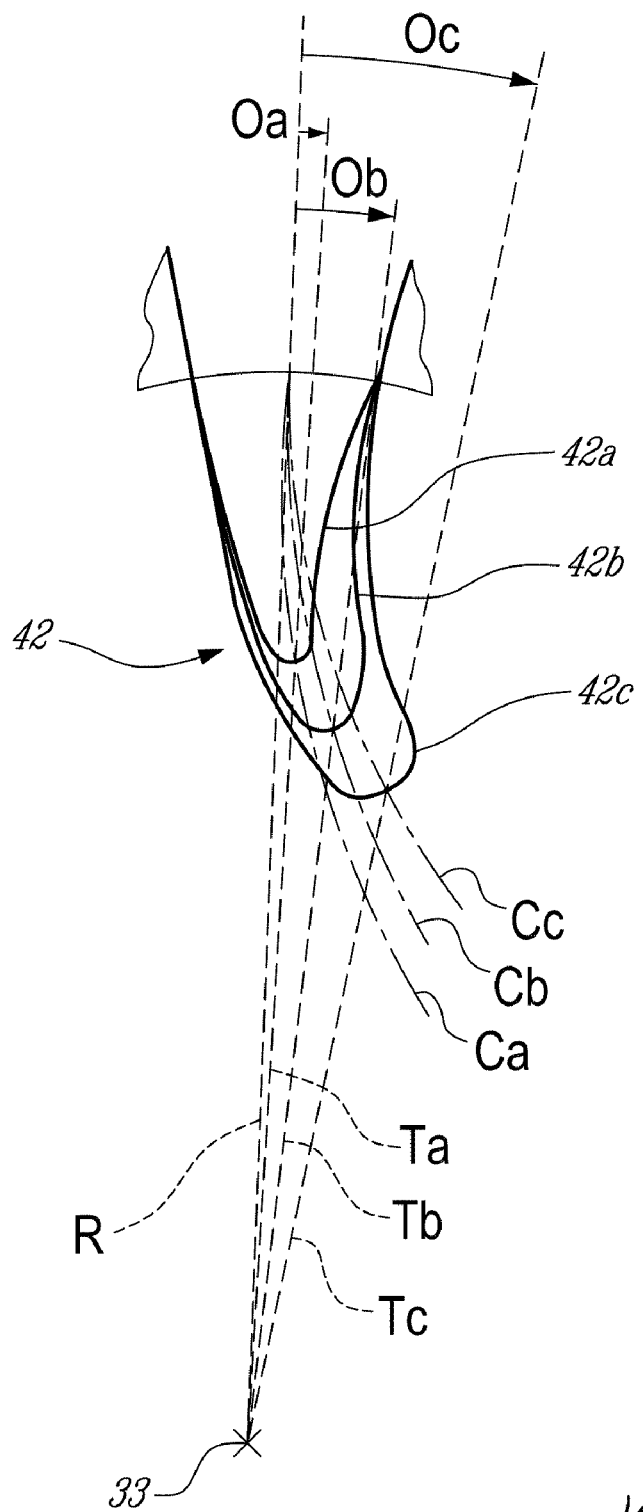
FIG. 5 shows in superposition three cross-sections of a same inner lobe within different planes defined along the length of the mixer.

In the embodiment shown, each inner lobe 42 curves progressively more away from the respective radial direction R of the main gas path as a distance from the upstream end 36 of the mixer 32 increases, i.e. the radial curve of each inner lobe 42 becomes progressively more pronounced toward the downstream end 38 of the mixer 32. This is illustrated in FIG. 5, where three cross-sections of a same inner lobe 42 are shown, with each cross-section being located in a respective plane extending perpendicularly to the longitudinal axis 33. Cross section 42c is located in a plane closer to the downstream end 38 of the mixer 32 than cross-section 42a, and cross-section 42b is located in a plane between that of cross-sections 42a and 42c. As -shown, the central line Cc of cross-section 42c is more curved with respect to the radial direction R than the central line Cb of cross-section 42b, which is more curved than the central line Ca of cross-section 42a.

Thus, referring back to FIGS. 3-4, for any plane extending perpendicularly to the longitudinal axis of the mixer, a straight line or radius T can be defined between the longitudinal axis 33 of the mixer 32 and the center of the tip 48 of each inner lobe 42. An angle measured from the radial direction R to the tip line T for each inner lobe 42 thus defines a circumferential or angular offset O between the base 46 and the tip 48 of that inner lobe 42 within that particular plane. The direction of the circumferential offset, defined from the base to the tip of each of the inner lobes, is the same for all of the inner lobes and opposite to that of the swirl component of the main gas path flow.

Referring back to FIG. 5, where the radial direction R and the tip lines Ta, Tb, Tc for the three cross-sections defined above are illustrated, and where cross section 42c is located in a plane closer to the downstream end 38 than cross-section 42b which is located closer to the downstream end 38 than cross-sections 42a, as set forth above, it can be seen that the circumferential offset Oc of cross-section 42c is larger than the circumferential offset Ob of cross-section 42b, which is larger than the circumferential offset Oa of cross-section 42a.

In a particular embodiment, the circumferential offset O is 0 at the downstream end of the frustoconical portion 40 of the mixer 32 and increases to up to 10 degrees.

In the embodiment shown, each of the inner lobes 42 extends in a non-twisted manner with respect to the longitudinal axis 33, i.e. the base 46 of each of the inner lobes 42 remain at a same angular position throughout the length of the mixer, as illustrated in FIG. 5 where the base portion of each of the cross-sections 42a, 42b, 42c overlap one another and where the radial direction R is the same for all cross-sections. In the embodiment shown, the inner lobes 42 are similar or identical to one another.

The circumferential offset O or degree of curve of the inner lobes 42, as well as their radial dimension, is selected according to the swirl component S to be removed or countered from the main gas flow. The offset and curve are selected such as to force the flow along an orientation opposite to that of the swirl component S in order to minimize or eliminate it. In a particular embodiment, a computer simulation of the engine flow is run in order to determine the swirl component S obtained in the combustion gases at the exit of the turbine section 18, and the offset, degree of curve, shape and radial dimensions for the inner lobes 42 is selected in accordance with the determined swirl. The design can be done following an iterative process until the swirl is acceptably reduced or eliminated.

In use, the inner lobes 42 separate at least part of the combustion gases flow into a plurality of circumferential portions, each flowing in between two adjacent ones of the inner lobes 42 within a path defined at a constant angular position throughout a length of the mixer 32. The shape of the inner lobes 42 forces each of the circumferential portions of the flow in a direction curved with respect to a respective radial direction R of the main gas path and along an orientation opposite to that of the swirl S. By forcing the flow in a direction opposite to the circumferential component present therein at entry into the mixer, the mixer realigns the flow with the axial direction, so that a substantially axial or axial flow of combustion gases exit the mixer for mixing with the axial flow of bypass air flowing between the outer lobes.

In the embodiment shown, the flow is forced in a direction curving progressively more away from the respective radial direction R as a distance from the upstream end 36 of the mixer 32 increases, and as a distance from the longitudinal axis 33 of the mixer 32 decreases. As such, as the combustion gases flow away from the upstream end 36, the flow is forced along a more pronounced radial curve in an orientation opposite to that of the swirl S. Also, the gases flowing further from the wall of the mixer 32, i.e. closer to the longitudinal axis 33, while remaining in between the inner lobes 42, is forced along a more pronounced radial curve as it is flowing closer to the curved tip 48 of the inner lobes 42.

As the flow in the bypass passage 24 typically already flows along an axial direction before reaching the mixer 32, the outer lobes 44 of the mixer 32 shown extend in a radially straight and symmetrical manner. In a particular embodiment, the outer lobes 44 are similar to that of typical prior "straight" mixers designed to receive a straightened flow from the main gas path 26.

The above description is meant to be exemplary only, and one skilled in the art will recognize that changes may be made to the embodiments described without departing from the scope of the invention disclosed. Alternate embodiments which are not shown include embodiment(s) where the degree of curve and/or the circumferential offset of the inner lobes remain constant or substantially constant throughout a length of the mixer; embodiment(s) where the inner lobes are straight but still angled with respect to the respective radial axis to create the circumferential offset; embodiment(s) where the inner lobes are twisted with respect to the longitudinal axis, i.e. where the angular position of the base of the inner lobes progressively changes along the length of the mixer, in addition to including the circumferential offset and optionally in addition to being curved with respect to the respective radial axis; embodiment(s) where all of the inner lobes are not identical to one another but where variations in the size, curve and/or offset are present within a same plane; and embodiments including two or more of these characteristics. Still other modifications which fall within the scope of the present invention will be apparent to those skilled in the art, in light of a review of this disclosure, and such modifications are intended to fall within the appended claims.

What is claimed is:

1. An exhaust mixer for a gas turbine engine of the type having an annular bypass passage for channelling air from a fan flow and a main gas path passage, the exhaust mixer being adapted to receive a flow from the main gas path passage having a swirl component in a given direction, the exhaust mixer comprising an upstream end, a downstream end, and an annular wall extending therebetween and defining a plurality of circumferentially distributed alternating inner and outer lobes, the outer lobes protruding into the annular bypass passage and the inner lobes protruding into the main gas path passage, each of the inner lobes having a base defined in alignment with the upstream end of the mixer and a tip, each of the inner lobes being configured with a circumferential offset between sections of the base and tip thereof located at a same distance from the upstream end of the mixer, the circumferential offset progressively increasing as the distance from the upstream end of the mixer increases, a direction of the circumferential offset defined from the base to the tip of each of the inner lobes being the same for all of the inner lobes and opposite to that of the swirl component.

2. The exhaust mixer as defined in claim 1, wherein the circumferential offset increases from a value of 0 in a position adjacent the upstream end of the mixer.

3. The exhaust mixer as defined in claim 1, wherein the circumferential offset is at most 10 degrees.

4. The exhaust mixer as defined in claim 1, wherein the base of each of the inner lobes remains at a same angular position throughout a length of the mixer.

5. The exhaust mixer as defined in claim 1, wherein each of the outer lobes has a base defined in alignment with the upstream end of the mixer and a tip, each of the outer lobes being configured without a circumferential offset between the base and the tip thereof.

6. The exhaust mixer as defined in claim 1, wherein at any location along the length of the mixer, the circumferential offset between the base and the tip of every one of the inner lobes is the same.

7. The exhaust mixer as defined in claim 1, wherein all of the inner lobes are identical to one another.

8. The exhaust mixer as defined in claim 1, wherein each of the inner lobes extends in a curved configuration with respect to a respective radial direction of the main gas path.

9. The exhaust mixer as defined in claim 8, wherein each of the inner lobes curves progressively more away from the respective radial direction of the main gas path as a distance from the upstream end of the mixer increases.

10. An exhaust mixer for a gas turbine engine of the type having an annular bypass passage for channelling air from a fan flow and a main gas path passage, the exhaust mixer comprising an upstream end, a downstream end, and an annular wall extending therebetween and defining a plurality of circumferentially distributed alternating inner and outer lobes, the outer lobes protruding into the annular bypass passage and the inner lobes protruding into the main gas path passage, each of the inner lobes having a base defined in alignment with the upstream end of the mixer and a respective radial direction extending between a center of the base thereof and a longitudinal axis of the mixer, and each of the inner lobes having a curved central line extending from the center of the base thereof to a center of a tip thereof and curving away from a same side of the respective radial direction with the curved central line and radial direction being defined at a same distance from the upstream end of the mixer, each of the inner lobes curving progressively more away from the respective radial direction as the distance from the upstream end of the mixer increases.

11. The exhaust mixer as defined in claim 10, wherein for each of the inner lobes, a circumferential offset between sections of the base and of a tip thereof located at a same distance from the upstream end of the mixer increases in a progressive manner as the distance from the upstream end of the mixer increases.

12. The exhaust mixer as defined in claim 10, wherein the base of each of the inner lobes remains at a same angular position throughout a length of the mixer.

13. The exhaust mixer as defined in claim 10, wherein each of the outer lobes has a base defined in alignment with the upstream end of the mixer and a respective outer lobe radial direction extending between a center of the base thereof and a longitudinal axis of the mixer, and each of the outer lobes having a central line extending from the center of the base thereof to a center of the tip thereof in alignment with the respective outer lobe radial direction.

14. The exhaust mixer as defined in claim 10, wherein all of the inner lobes are identical to one another.

15. A method of removing at least part of a swirl component of a main gas path flow of a gas turbine engine, the method comprising receiving the main gas path flow with the swirl component at a discharge end of the gas turbine engine within an annular passage having an outer wall defined by a mixer, and directing each of a plurality of circumferential portions of the main gas path flow from an upstream end of the mixer to a downstream end of the mixer along the outer wall within a path defined at a constant angular position while forcing each of the plurality of circumferential portions of the flow along a flow direction curved with respect to a respective radial direction of the main gas path and oriented opposite to the swirl component with the flow direction and respective radial direction being defined at a same distance from the upstream end of the mixer, the flow direction curving progressively more away from the respective radial direction as the distance from the upstream end of the mixer increases.

16. The method as defined in claim 15, wherein forcing each of the plurality of circumferential portions of the flow is done such that the flow direction curves progressively more away from the respective radial direction as a distance from a longitudinal axis of the mixer decreases.

* * * * *